(12) United States Patent
Fraser et al.

(10) Patent No.: US 8,630,817 B2
(45) Date of Patent: Jan. 14, 2014

(54) SELF CENTERING BORE MEASUREMENT UNIT

(75) Inventors: Daniel Fraser, Charlotte, NC (US); Erik A. Lombardo, Sharon, SC (US)

(73) Assignee: Siemens Energy, Inc., Orlando, FL (US)

( * ) Notice: Subject to any disclaimer, the term of this patent is extended or adjusted under 35 U.S.C. 154(b) by 491 days.

(21) Appl. No.: 13/048,061

(22) Filed: Mar. 15, 2011

(65) Prior Publication Data

US 2012/0239345 A1 Sep. 20, 2012

(51) Int. Cl.
 *E21B 17/10* (2006.01)
 *E21B 47/08* (2012.01)
 *G01B 5/12* (2006.01)
 *G06F 17/40* (2006.01)

(52) U.S. Cl.
 USPC ............. 702/157; 73/152.01; 73/152.57; 73/865.8; 702/1; 702/127; 702/187

(58) Field of Classification Search
 USPC .......... 33/501, 520; 73/152.01, 152.54, 73/152.57, 432.1, 865.8, 866.3; 166/244.1, 250.01; 175/40; 250/200, 250/253, 256, 559.01, 559.19, 559.25; 340/500, 540, 678, 686.1, 686.2, 340/686.4, 686.6, 853.1; 356/3, 4.01, 72, 356/73, 525, 535; 702/1, 2, 6, 127, 155, 702/157, 158, 159, 187
 IPC ........... B23B 27/00; E21B 17/00,17/10, 17/14, E21B 17/21, 47/00, 47/08; G01B 5/00, 5/08, G01B 5/12, 11/00, 11/08, 11/12, 21/00, 21/10, G01B 21/14; G01D 7/00, 9/00, 21/00; G06F 11/00,11/30, 11/32, 11/34, 17/00, 17/40, G06F 19/00

See application file for complete search history.

(56) References Cited

U.S. PATENT DOCUMENTS

| | | | | |
|---|---|---|---|---|
| 2,651,199 | A | * | 9/1953 | Collins et al. ............... 166/241.5 |
| 2,980,854 | A | * | 4/1961 | En Dean et al. ................ 324/72 |
| 3,024,651 | A | * | 3/1962 | McGlasson ................ 73/152.57 |
| 3,058,227 | A | * | 10/1962 | Camp .......................... 33/544.3 |
| 3,087,552 | A | * | 4/1963 | Graham ........................ 166/243 |
| 3,460,028 | A | * | 8/1969 | Beaver et al. .................. 324/220 |
| 3,555,689 | A | | 1/1971 | Cubberly, Jr. |
| 3,803,518 | A | * | 4/1974 | Perthen ........................ 33/544.1 |
| 3,835,953 | A | | 9/1974 | Summers |
| 4,307,514 | A | | 12/1981 | Ange et al. |
| 4,571,848 | A | | 2/1986 | Krütz et al. |
| 4,595,055 | A | | 6/1986 | Vannier |
| 4,616,258 | A | * | 10/1986 | Ono et al. ........................ 348/84 |
| 5,329,824 | A | * | 7/1994 | Carapezza et al. ........... 73/866.5 |
| 5,785,125 | A | * | 7/1998 | Royer ........................... 166/380 |

FOREIGN PATENT DOCUMENTS

EP 1344893 A2 9/2003
GB 816524 A 7/1959

* cited by examiner

*Primary Examiner* — Edward Cosimano

(57) ABSTRACT

Disclosed is a bore measurement unit having an elongate main body with first and second ends. A first adjustment mechanism is disposed near the first end and a second adjustment mechanism is disposed near said second end. The adjustment mechanisms expand or contract, through triangulating arms, to relative diameters, such that when the unit is inserted into a hollow bore it may be centered therein. A measuring portion of the unit measures the internal diameter of the bore. The measuring unit includes at least one sensor and preferably takes more than three readings at each distance of insertion to formulate a best fit circle of the inner bore diameter.

20 Claims, 5 Drawing Sheets

SELF CENTERING BORE MEASUREMENT UNIT

BACKGROUND OF THE INVENTION

The present invention relates to the measurement of bore diameters within hollow members. Specifically, the present invention is directed to a self centering bore measurement unit.

It is well known that accurate bore measurements of hollow members provide important data in the analysis of the members and the apparatuses which they form a part of. This data is highly desirable in the manufacture and maintenance of generator rotor bores, turbine shaft bores, and the like. For example, initial bore diameter readings may be used to determine whether a bore has been constructed to proper specifications. Additionally, bore creep or areas of high stress may be revealed through periodic bore measurement testing during use.

However, known techniques for measuring bore diameters have limitations.

BRIEF SUMMARY OF THE INVENTION

Current bore measurement devices are limited in several manners. As one example, they cannot measure the entire length of bores that have certain geometries. They may therefore be limited to measuring bores that do not include bottlenecks or variances in cross-sectional diameter. They may also be limited to bores that are below certain overall lengths. Current bore measurement devices may also be incapable of accurately measuring bores that include an irregular surface within the bore itself, such as a dimple created during a routine defect fixing procedure.

Additionally, conventional bore measuring units are limited to three measurement points around the bore diameter at a particular linear position within the bore. Although it will be recognized that three points are the minimal number of points required to produce a circle, adding more data points to the analysis creates a more accurate "best fit" reading of the actual bore diameter.

Lastly, conventional bore measurement units must also be specifically arranged for a single bore diameter. These units cannot dynamically adjust to bores of different diameters, let alone a single bore having a variable diameter.

In view thereof, the present invention provides for a self centering bore measurement unit that is capable of performing accurate bore measurements in bores of various geometries and conditions.

In one embodiment a bore measurement unit may comprise an elongate main body having a first end and a second end, a first adjustment mechanism disposed near the first end, the first adjustment mechanism expanding or contracting to relative diameters, a second adjustment mechanism disposed near the second end, the second adjustment mechanism expanding or contracting to relative diameters, and a measuring portion associated with the main body, the measuring portion adapted to measure the internal diameter of the bore of a hollow member. When the elongate main body is inserted into a bore of a hollow member, the first and second adjustment mechanisms may be expanded to generally center the elongate main body within the bore such that the measuring portion may measure the internal diameter thereof.

The first adjustment mechanism may comprise a fixed collar fixedly positioned about the elongate main body, a sliding collar configured in a sliding relation about the elongate main body, and three arms connecting the first fixed collar to the first sliding collar, the arms each being hinged to collectively triangulate to form a relative diameter. Sliding of the sliding collar toward the fixed collar may increase the relative diameter of the first adjustment mechanism while sliding of the sliding collar away from the fixed collar may decrease the relative diameter of the first adjustment mechanism. In other arrangements, this may be opposite.

The first adjustment mechanism may further comprise a wheel associated with each hinged arm, the wheels positioned at hinges of the arms at the relative diameter.

The bore measurement unit may further comprise a linear actuator coupling the sliding collar of the first adjustment mechanism to the elongate body such that the linear actuator moves the sliding collar relative to the elongate body. The linear actuator may be a pneumatically operated magnetically coupled rodless cylinder, or other type of actuator such as a screw driven actuator.

The first adjustment mechanism and the second adjustment mechanism may be separably adjustable, the adjustment mechanisms capable of forming two different relative diameters such that the elongate member remains centered in a bore having a variable diameter. In such case, there may be two linear actuators.

The measuring portion may comprise at least one photoelectric distance sensor which rotates to sense distances associated with the inner bore diameter of the hollow member about 360° cycles. The photoelectric distance sensor may take at least four readings during each cycle for a total of at least four distance readings. The bore measurement unit may further comprise a data collection and processing computer with display, wherein the at least four distance readings are collected and fitted to a best fit circle whose dimensions are displayed on the display.

The measuring portion may comprise two photoelectric distance sensors, the photoelectric distance sensors each rotating in at least 180° cycles and each taking at least two distance readings during each cycle.

The measuring portion may measures the bore diameter of the hollow member to within a tolerance of approximately $\frac{1}{1000}$".

In another embodiment of the present invention, a method of measuring the inner bore diameter of a hollow shaft may comprise inserting an elongate measuring device comprising a first adjustment mechanism, a second adjustment mechanism, and a measuring portion into the inner bore, the adjustment members adjustable to relative diameters; adjusting the relative diameters of the first adjustment mechanism and the second adjustment mechanism such that the adjustment mechanisms each abut the inner bore at their relative diameters to generally center the elongate measuring device within the bore; and activating the measuring portion to take a plurality of measurement readings of the inner bore in an area adjacent to the measuring portion.

The method may further comprise moving the elongate measuring device along the length of the inner bore and activating the measuring portion to take a second plurality of measurement readings of the inner bore in an area adjacent to the measuring portion.

The moving step may comprise adjusting the relative diameter of at least one of the adjustment mechanisms.

The step of inserting may be achieved by pushing the elongate measuring device in the bore with a graduated measuring rod. In such case, the method may further comprise identifying the depth of penetration into the inner bore of the measuring portion and moving the elongate measuring device along the length of the inner bore a predetermined distance. Then the method may include activating the measuring portion to take a second plurality of measurement readings of the inner bore in an area adjacent to the measuring portion.

The step of activating the measuring portion may take at least three readings of the inner bore in an area adjacent to the measuring portion. The readings may be conveyed to and stored in a data collection and processing computer.

The measurement portion may include two sensors, each adapted to take measurement readings.

In a further embodiment of the present invention, a bore measurement unit for measuring the internal diameter of a hollow member having a bore with a longitudinal axis may comprise an elongate main body having a longitudinal axis, two adjustment mechanisms associated with the main body, the adjustment mechanisms each triangulating to expand and position the longitudinal axis of the elongate main body along the longitudinal axis of the bore when the elongate main body is inserted therein, and a rotating sensor, the rotating sensor taking a plurality of readings of the internal diameter of the hollow member.

BRIEF DESCRIPTION OF THE DRAWINGS

The above description, as well as further objects, features and advantages of the present invention will be more fully understood with reference to the following detailed description of the self centering bore measurement unit when taken in conjunction with the accompanying drawings, wherein.

DETAILED DESCRIPTION

In describing the preferred embodiments of the subject matter illustrated and to be described with respect to the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Described herein are embodiments of the self centering bore measurement unit of the present invention. The bore measurement unit is designed to measure the inner bore diameter of hollow members such as generator rotor bores, turbine shaft bores, and the like. It is envisioned that the bore measurement unit be capable of measuring bores with internal diameters in the range of approximately 4"Ø to 12"Ø and be accurate to within approximately 0.001" (or approximately 25.4 microns). Ideally, the bore measuring unit is capable of measuring bore diameters at least as small as 4.25"Ø. Additionally, the bore measurement unit may measure bores within hollow members of upwards of 50 feet in length or more. The measurements may be taken prior to start-up of the hollow member or periodically during use, for example once per year.

Figure 1:
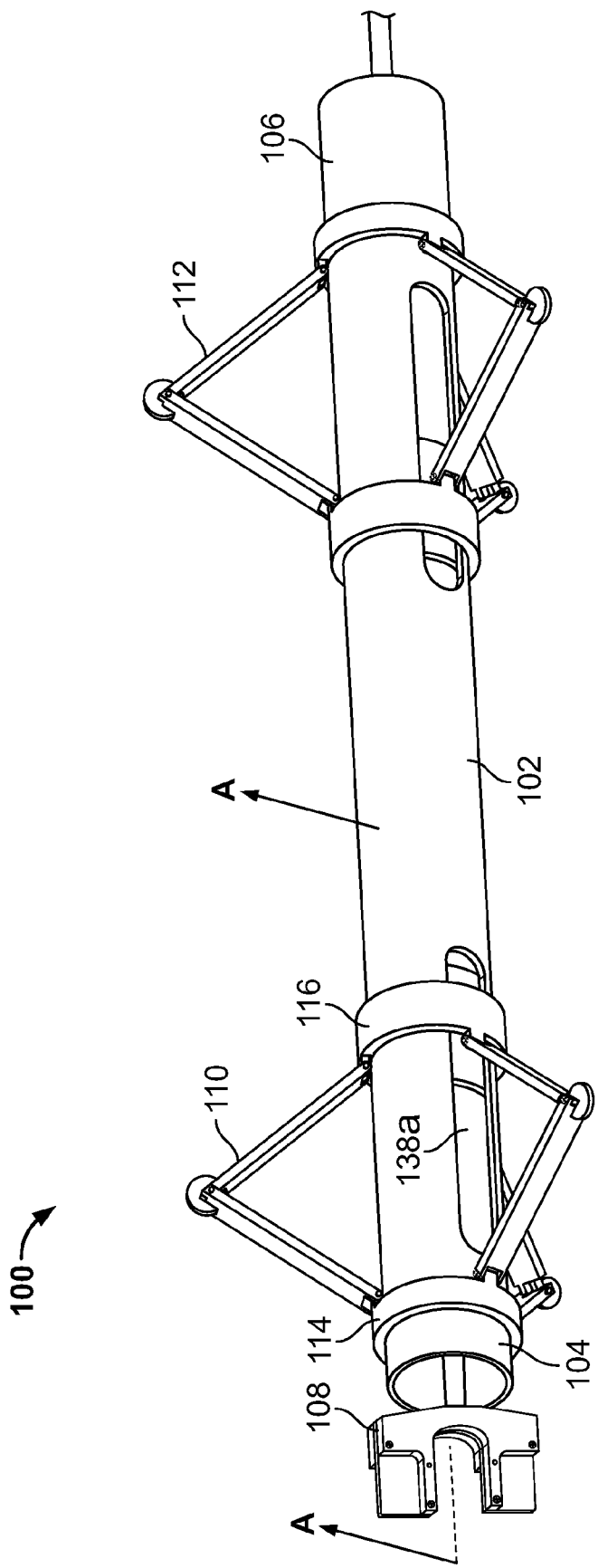
FIG. 1 depicts a schematic view of a bore measuring unit in accordance with one embodiment of the present invention.

FIG. 1 depicts a schematic view of a bore measurement unit 100 in accordance with one embodiment of the present invention. As shown in FIG. 1, the bore measurement unit includes an elongate and cylindrical main body 102 having a first end 104 and a second end 106. The first end 104 includes a measurement portion 108 adapted to detect measurements of the internal bore diameter of hollow members within which the bore measurement unit is inserted. Between the first end and second end 104, 106 of the bore measurement unit 100, and preferably near the first end and second end respectively, are spaced apart adjustment mechanisms in the form of a first adjustment mechanism 110 and second adjustment mechanism 112. As will be discussed, the adjustment mechanisms 110, 112 alter the overall diameter of the bore measurement unit 100 and maintain the main body 102 in an orientation which is parallel to, and centered within, an internal bore of a hollow member.

Figure 2:
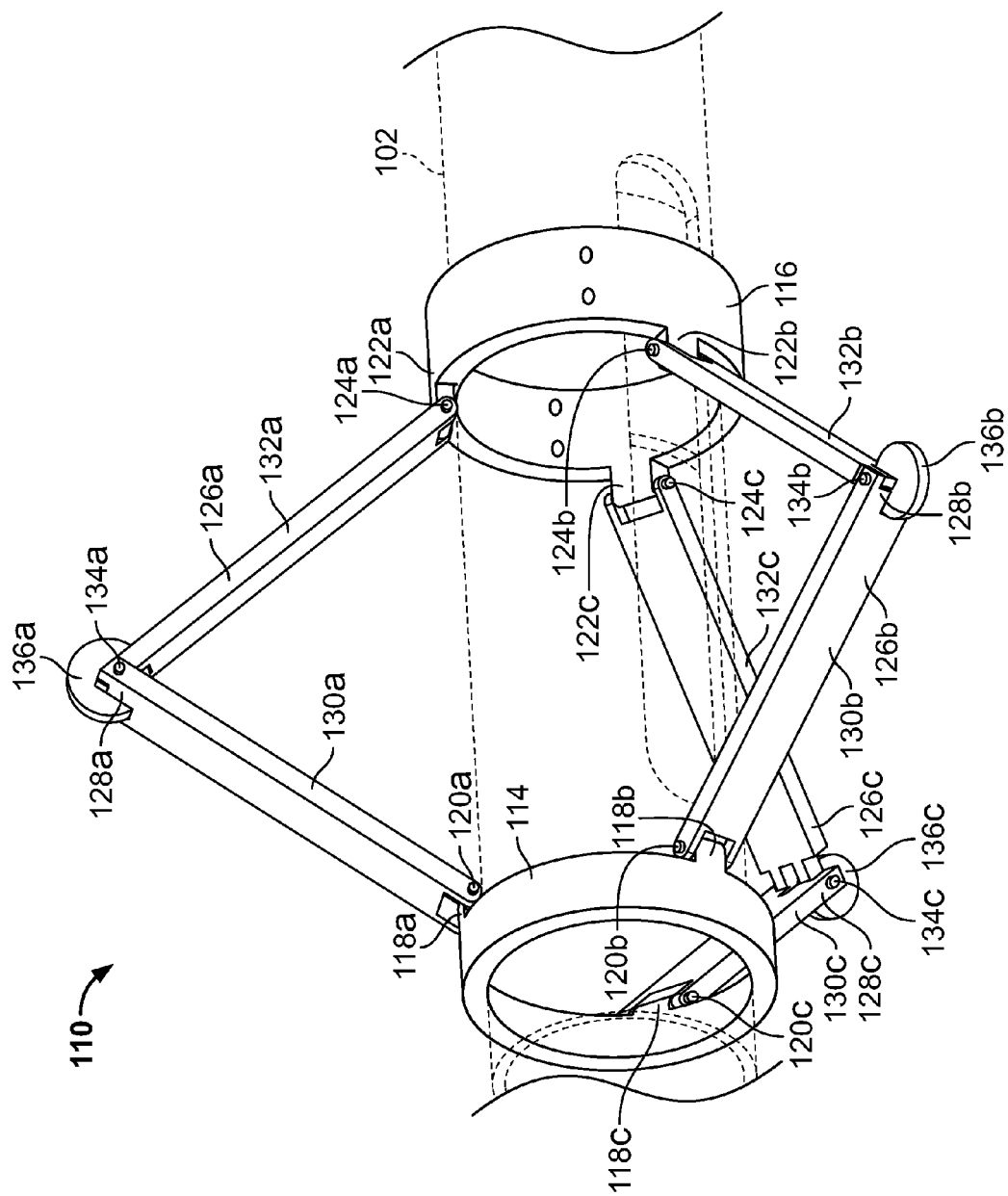
FIG. 2 depicts a detailed schematic view of the first adjustment mechanism of the bore measurement unit of FIG. 1.

Moving to FIG. 2, there is shown a detailed schematic view of the first adjustment mechanism 110 of the bore measurement unit 100. The mechanism consists of several components, including a fixed collar 114 and a sliding collar 116, both of which are generally annular in shape.

As the name suggests, the fixed collar 114 is fixedly attached to the main body 102, for example by welding, chemical bonding, or mechanical fixation. The fixed collar 114 includes three ears, 118a, 118b, 118c, preferably spaced at 120° intervals around the fixed collar, the ears facing the sliding collar 116. Each of the ears includes an aperture (not visible in the drawings) through which pins 120a, 120b, 120c may be driven to form pivot axes.

The sliding collar 116 is arranged similarly to the fixed collar 114, and also includes ears 122a, 122b, 122c, preferably spaced at 120° intervals around the sliding collar, or at least at intervals corresponding to those of the ears 118a, 118b, 118c of the fixed collar. Ears 122a, 122b, 122c face the fixed collar 114 and include apertures (not visible in the drawings) through which pins 124a, 124b, 124c may be driven to form pivot axis. Unlike the fixed collar 114, the sliding collar 116 is not fixed in longitudinal relation to the main body 102.

Connecting the corresponding ears, i.e. ear 118a to ear 122a, ear 118b to ear 122b, and ear 118c to ear 122c, are three pairs of arms, 126a, 126b, 126c. Each of the arms articulates about joints 128a, 128b, 128c formed at the junction between first arm segments 130a, 130b, 130c and second arm segments 132a, 132b, 132c. It will be appreciated that the first arm segments 130a, 130b, 130c and second arm segments 132a, 132b, 132c may be equal in length or may differ in length. However, it is preferred that at least all of the first arm segments 130a, 130b, 130c be of equal length and all of the second arm segments 132a, 132b, 132c also be of equal lengths, even if different than the first arm segments. Additionally, the overall lengths of arms 126a, 126b, 126c should preferably be equal.

The joints 128a, 128b, 128c are formed from corresponding apertures (not visible in the drawings) of the first arm segments 130a, 130b, 130c and second arm segments 132a, 132b, 132c, which are pinned together by pins 134a, 134b, 134c. Sandwiched within each joint 128a, 128b, 128c are wheels 136a, 136b, 136c which are arranged to roll freely along the longitudinal axis of the main body 102, for example by rotating around the respective pins 134a, 134b, 134c. Preferably, the wheels are non-marring and include relatively easy rolling bearings.

Although not described in detail herein, it will be appreciated that the second adjustment member 112 is configured in much the same manner as the first adjustment member 110.

Referring back to FIG. 1, the main body 102 is shown with a pair of longitudinally aligned slots each associated with one of the adjustment members 110, 112. Using first adjustment member 110 as an example, it is shown that the slot 138a extends from a point between the fixed collar 114 and the sliding collar 116 to a point outside the sliding collar 116. Not shown in FIG. 1 are additional slots located 180° around the main body 102 from the two slots shown. Slots in this 180° relation are shown in FIG. 3 as slots 138*a*, 138*b*.

Figure 3:
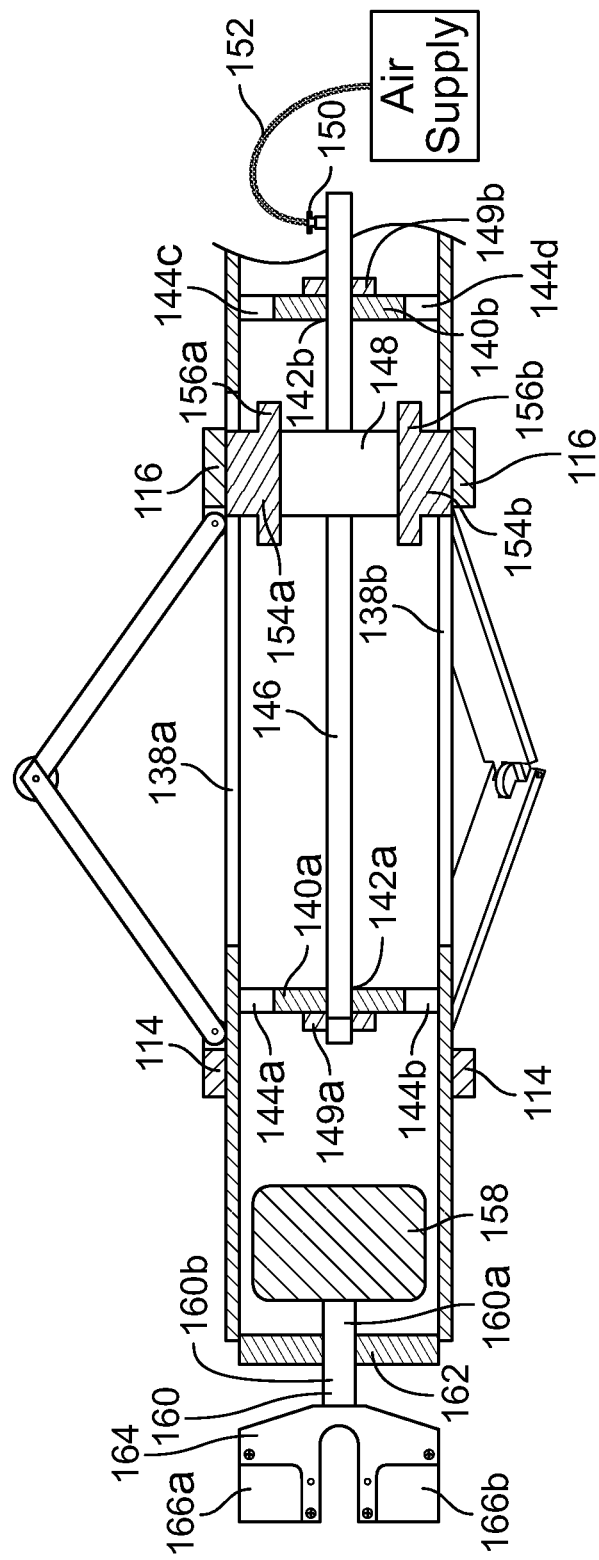
FIG. 3 depicts a partial cross-sectional view of the bore measurement unit of FIG. 1.

FIG. 3 depicts a partial cross-sectional view of the bore measurement unit 100 of FIG. 1. Within the interior of the bore measurement unit 100, and associated with the first adjustment mechanism 110, there are shown a pair of spaced apart actuator supports 140*a*, 140*b*. The actuator supports 140*a*, 140*b* may be generally circular bodies with a hollow central area 142*a*, 142*b* and a plurality of cutouts 144*a*, 144*b*, 144*c*, 144*d*. The supports 140*a*, 140*b* support a linear actuator, preferably in the form of a magnetically coupled rodless cylinder 146, that spans between the two supports. The magnetically coupled rodless cylinder 146 is positioned through the hollow central areas 142*a*, 142*b* and may be held in place with mechanical hardware such as bolts 149*a*, 149*b* on the outsides of the respective supports. The cutouts 144*a*, 144*b*, 144*c*, 144*d* of the actuator supports 140*a*, 140*b* provide pathways for wires and the air supply to travel. As will be discussed, the wires are for power and signaling of electronics such as a motor and sensor and the air supply is for operation of pneumatic elements.

It will be appreciated that the magnetically coupled rodless cylinder 146 includes a mount 148 that travels along the cylinder under the influence of air pressure or vacuum, in the conventional manner. Thus, an air tap 150 provided on the magnetically coupled rodless cylinder 146 is connected to an air hose 152, as shown in FIG. 3. The air hose is in turn connected to an air supply that provides standard "shop air" in the range of approximately 90 psi to expand the adjustment mechanisms 110, 112. Upon removal of the "shop air," the adjustment mechanisms 110, 112 are permitted to return to a contracted condition putting the bore measurement unit 100 in the configuration of its smallest diameter. This is advantageous, for example, when removing the bore measurement unit 100 from a bore, as will be discussed. Magnetically coupled rodless cylinders suitable for this application include those provided as Series NCY3B by the SMC Corporation.

Connected to the mount 148 are a pair of actuator attachments 154*a*, 154*b*. The actuator attachments 154*a*, 154*b* attach to the mount 148 and each include an extension portion 156*a*, 156*b* that is sized and configured to fit firmly within the slots 138*a*, 138*b*, respectively, and to travel within the slots. As air is provided or removed from the magnetically coupled rodless cylinder 146 through the air tap 150, the mount 148 slides along the magnetically coupled rodless cylinder and therefore the main body 102, bound only by the limits of the slots 138*a*, 138*b*. This movement causes the legs 126*a*, 126*b*, 126*c* of the first adjustment mechanism 110 to expand or contract, thus altering the overall diameter of the bore measurement unit 100.

At the first end 104 of the bore measurement apparatus, and forming the measurement portion 108, are components adapted for measuring the inner bore diameter of a hollow member within which the bore measurement unit 100 is inserted. Toward this end, the measurement portion 108 includes a motor encoder 158 positioned within the main body 102. The motor encoder 158 is an electric motor that spins a shaft 160 while converting the angular position of the shaft to an analog or digital code that may be read by a computer processor, such as that to be described. In addition, the shaft may also include a proximity sensor (not shown), to also read the angular start/stop position. The shaft 160 includes a portion 160*a* within the main body 102, and a portion 160*b* outside the main body. The shaft 160 is held in place with a slip ring 162 forming the end of the main body 102, the slip ring permitting rotation of the shaft without electrical wires of the sensor being an impediment. Connected to the shaft 160 at its outside portion 160*b* is a sensor support 164, in the case of FIG. 3 being a double sensor support. The sensor support 164 holds one or more sensors 166*a*, 166*b* firmly in place while the shaft 160 spins the entire sensor support and sensor combination. It is important that the sensor support hold the sensors 166*a*, 166*b* firmly such that the sensors 166*a*, 166*b* do not shift during use, which might introduce errors in the distance readings.

The sensors 166*a*, 166*b* are preferably photoelectric distance sensors that are not sensitive to surface finish in the manner of laser sensors, although they may also be configured as other types of sensors such as laser sensors. Preferably, the sensors 166*a*, 166*b* are of the type manufactured by the Baumer Electronic company, such as model OADMI2.

Figure 4A:
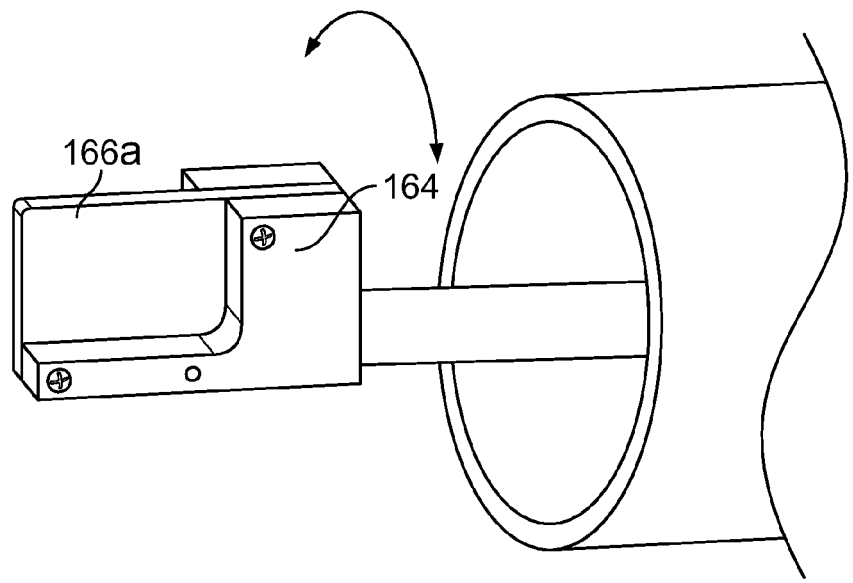
FIGS. 4A and 4B depict detailed views of the measuring portion of the bore measurement unit of FIG. 1 with one sensor and two sensors, respectively; and, FIG. 5 depicts the bore measuring unit of FIG. 1 in use within the bore of a hollow member.
Figure 4B:
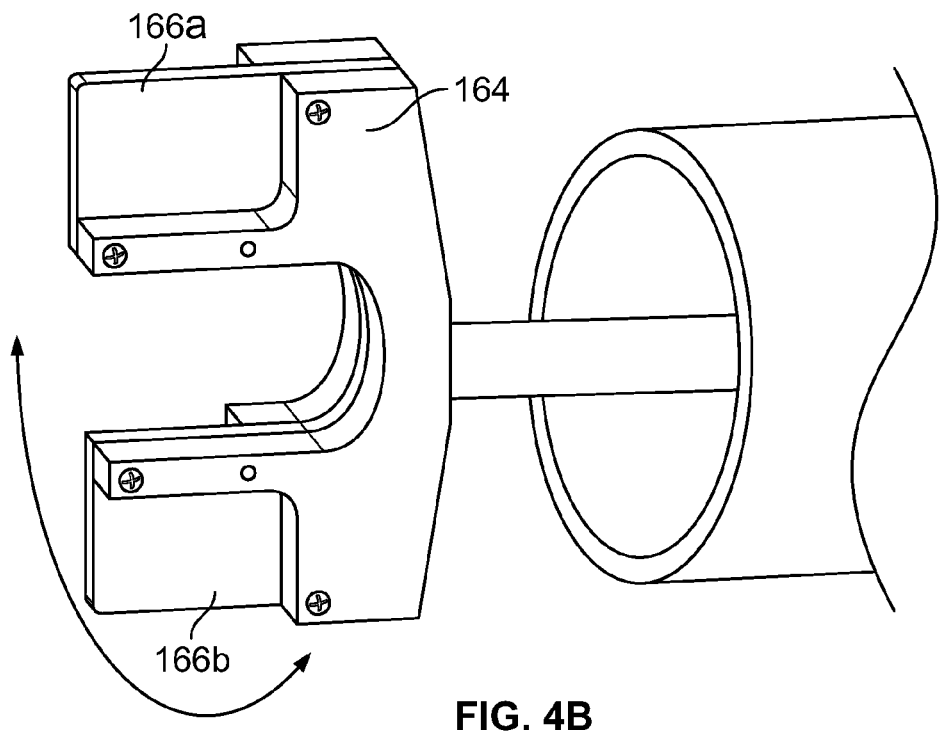

In the embodiment shown in FIG. 3, the sensors 166*a*, 166*b* are diametrically opposed from each other such that an entire 360° internal diameter reading may be obtained from a motor sweep of 180°. However, space considerations may require that a single sensor 166*a* be utilized. In such case, the sensor 166*a* can be swept through the full 360° 's of revolution for each internal diameter reading. FIGS. 4A and 4B depict enlarged views of a single sensor 166*a* measurement portion 108 and a double sensor 166*a*, 166*b* measurement portion, respectively. Of course, more than two sensors may also be utilized.

Figure 5:
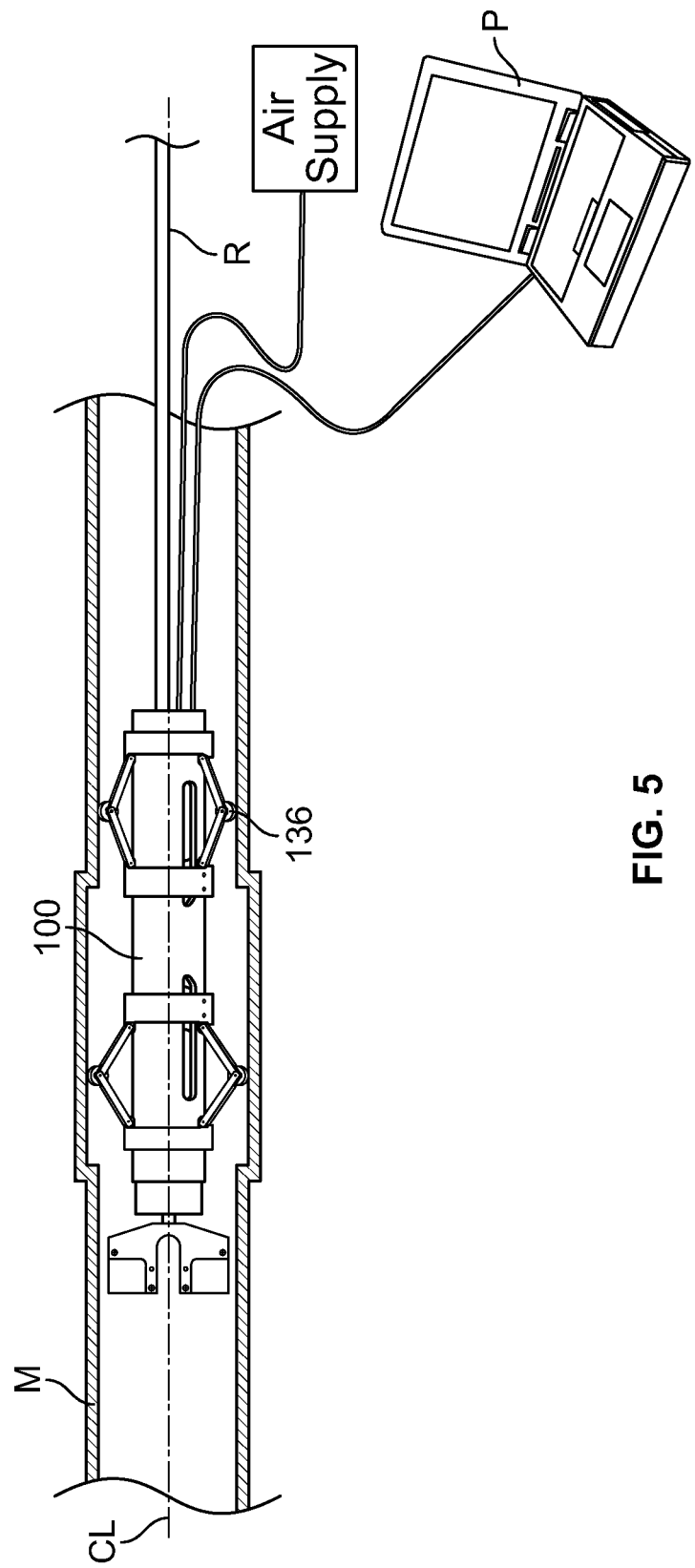

Shown in FIG. 5 is a bore measurement unit 100 inserted within a bore of a hollow member (M). As shown in FIG. 5, the complete bore measurement unit 100 also includes a data Collection and processing computer, or computer processor (P), which is connected to the electronics of the unit, including the motor encoder 158 and one or more sensors 166*a*, 166*b*. Preferably, the computer processor (P) includes a display to indicate past readings and other information.

To insert the bore measurement unit 100, an operator will place the unit in its smallest diameter configuration, with the adjustment mechanisms 110, 112 fully retracted or nearly so. The unit 100 may then be placed within the bore of a hollow member (M). Air may then be slowly introduced into the magnetically coupled rodless cylinders 146 of each adjustment mechanism 110, 112, which may be through a common header or independently, depending on the physical arrangement and needs of the operator. For example, complex inner bore diameters may require independent adjustment. The air moves the mounts 148 within the slots 138*a*, 138*b* and thereby expands the adjustment mechanisms 110, 112. This expansion causes the wheels 136 to abut the inner diameter of the hollow member (M), while centering the bore measurement unit 100 along a common longitudinal centerline (CL) of the hollow member (M) and the bore measurement unit 100.

A rod (R) may be used to push the bore measurement unit 100 into the hollow member. Preferably, the rod (R) is indexed such that internal diameter readings may be taken at fixed intervals. The insertion may be achieved manually, in which case an operator can align the indexes with a fixed position, such as the extreme second end 106 of the bore measurement unit 100, or with an electronic displacement mechanism. Air pressure in the magnetically coupled rodless cylinders 146 may be adjusted to account for differing diameters of the hollow member (M) as the bore measurement unit 100 is advanced into the bore. Bores of upwards of 50 feet or more may be measured by adding to the length of the rod (R), for example by adding screw-on segments.

The fixed interval for readings may be on the order of ¼" to several inches, and is generally approximately every inch. As such, at every inch (or other fixed interval) of insertion, a best fit circle of the inner bore diameter of the hollow member (M) is taken, and recorded by the computer processor. In the manual insertion operation, the operator may enter a keystroke into the computer processor (P) to advise that a new reading should be taken. In such case, the excursion of the bore measurement unit 100 into the hollow member (M) may be manually entered. Where the bore measurement unit 100 is first inserted automatically, the operation may be automated.

A minimum of three bore diameter readings may be taken at each interval, three bore diameters representing the minimum number of readings necessary to complete a best fit circle. Preferably, many more diameters may be read, for example one at each degree of rotation. As a greater number of diameter readings are taken at each interval, more computing power and storage capabilities are necessary. As such, the manufacturer may decide a proper balance between system requirements and sensitivity. Preferably, the system is set up to take at least one reading for each degree of the 360° diameter. The proximity sensor (not shown) may be utilized to ensure that the sensors achieve a full sweep of rotation, be that 360° for a single sensor or 180° for a double sensor setup.

Upon reading of bore diameters throughout the hollow member, or through whatever portion is desired, the bore measurement unit 100 may be removed. This is achieved by withdrawing the rod (R) in the manual operation or reversing operation of the automated insertion operator. Again, air pressure may be adjusted periodically as necessary.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A bore measurement unit comprising:
   an elongate main body having a first end and a second end;
   a first adjustment mechanism disposed near said first end, the first adjustment mechanism expanding or contracting to relative diameters;
   a second adjustment mechanism disposed near said second end, the second adjustment mechanism expanding or contracting to relative diameters;
   a measuring portion associated with said main body, the measuring portion adapted to measure the internal diameter of the bore of a hollow member;
   wherein when said elongate main body is inserted into a bore of a hollow member, said first and second adjustment mechanisms are expanded to generally center said elongate main body within said bore such that said measuring portion may measure the internal diameter thereof.

2. The bore measurement unit of claim 1, wherein said first adjustment mechanism and said second adjustment mechanism are separably adjustable, said adjustment mechanisms capable of forming two different relative diameters such that said elongate member remains centered in a bore having a variable diameter.

3. The bore measurement unit of claim 1, wherein said measuring portion measures the bore diameter of the hollow member to within a tolerance of approximately ⅟₁₀₀₀".

4. The bore measurement unit of claim 1, wherein said first adjustment mechanism comprises a fixed collar fixedly positioned about said elongate main body, a sliding collar configured in a sliding relation about said elongate main body, and three arms connecting said first fixed collar to said first sliding collar, said arms each being hinged to collectively triangulate to form a relative diameter, wherein sliding of said sliding collar toward said fixed collar increases the relative diameter of said first adjustment mechanism and sliding of said sliding collar away from said fixed collar decreases the relative diameter of said first adjustment mechanism.

5. The bore measurement unit of claim 4, wherein said first adjustment mechanism further comprises a wheel associated with each hinged arm, said wheels positioned at hinges of said arms at the relative diameter.

6. The bore measurement unit of claim 4, further comprising a linear actuator coupling said sliding collar of said first adjustment mechanism to said elongate body such that said linear actuator moves said sliding collar relative to said elongate body.

7. The bore measurement unit of claim 6, wherein said linear actuator is a pneumatically operated magnetically coupled rodless cylinder.

8. The bore measurement unit of claim 1, wherein said measuring portion comprises at least one photoelectric distance sensor which rotates to sense distances associated with the inner bore diameter of the hollow member about 360° cycles.

9. The bore measurement unit of claim 8, wherein said photoelectric distance sensor takes at least four readings during each cycle for a total of at least four distance readings.

10. The bore measurement unit of claim 9, further comprising a data collection and processing computer with display, wherein said at least four distance readings are collected and fitted to a best fit circle whose dimensions are displayed on said display.

11. The bore measurement unit of claim 9, wherein said measuring portion comprises two photoelectric distance sensors, the photoelectric distance sensors each rotating in at least 180° cycles and each taking at least two distance readings during each cycle.

12. A method of measuring the inner bore diameter of a hollow shaft, said method comprising:
    inserting an elongate measuring device comprising a first adjustment mechanism, a second adjustment, mechanism, and a measuring portion into the inner bore, the adjustment members adjustable to relative diameters;
    adjusting the relative diameters of the first adjustment mechanism and the second adjustment mechanism such that the adjustment mechanisms each abut the inner bore at their relative diameters to generally center the elongate measuring device within the bore;
    activating the measuring portion to take a plurality of measurement readings of the inner bore in an area adjacent to the measuring portion.

13. The method of claim 12, wherein the measurement portion includes two sensors, each adapted to take measurement readings.

14. The method of measuring of claim 12, further comprising:
    moving the elongate measuring device along the length of the inner bore;
    activating the measuring portion to take a second plurality of measurement readings of the inner bore in an area adjacent to the measuring portion.

15. The method of measuring of claim 14, wherein said moving step comprises adjusting the relative diameter of at least one of the adjustment mechanisms.

16. The method of measuring of claim 12, wherein said step of inserting is achieved by pushing the elongate measuring device in the bore with a graduated measuring rod.

17. The method of claim 16, further comprising:
identifying the depth of penetration into the inner bore of the measuring portion;
moving the elongate measuring device along the length of the inner bore a predetermined distance;
activating the measuring portion to take a second plurality of measurement readings of the inner bore in an area adjacent to the measuring portion.

18. The method of claim 12, wherein said step of activating the measuring portion takes at least three readings of the inner bore in an area adjacent to the measuring portion.

19. The method of claim 18, wherein the readings are conveyed to and stored in a data collection and processing computer.

20. A bore measurement unit for measuring the internal diameter of a hollow member having a bore with a longitudinal axis, the bore measurement unit comprising:
an elongate main body having a longitudinal axis;
two adjustment mechanisms associated with said main body, the adjustment mechanisms each triangulating to expand and position the longitudinal axis of the elongate main body along the longitudinal axis of the bore when the elongate main body is inserted therein;
a rotating sensor, the rotating sensor taking a plurality of readings of the internal diameter of the hollow member.

* * * * *